US007886519B2

United States Patent
Woessner et al.

(10) Patent No.: US 7,886,519 B2
(45) Date of Patent: Feb. 15, 2011

(54) SOLID PROPELLANT BURN RATE, PROPELLANT GAS FLOW RATE, AND PROPELLANT GAS PRESSURE PULSE GENERATION CONTROL SYSTEM AND METHOD

(75) Inventors: George T. Woessner, Phoenix, AZ (US);
Stephen G. Abel, Chandler, AZ (US);
Ronald A. Peck, Phoenix, AZ (US);
Mark H. Baker, Scottsdale, AZ (US);
Donald J. Christensen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 654 days.

(21) Appl. No.: 11/683,170

(22) Filed: Mar. 7, 2007

(65) Prior Publication Data

US 2008/0216462 A1  Sep. 11, 2008

(51) Int. Cl.
*F02K 9/00* (2006.01)
(52) U.S. Cl. .............................. 60/254; 60/234; 60/204; 60/219; 60/262; 60/263; 239/265.11; 239/265.17
(58) Field of Classification Search .................. 60/254, 60/234, 204, 219, 262, 263; 239/265.17, 239/265.11
See application file for complete search history.

(56) References Cited

U.S. PATENT DOCUMENTS

| 3,121,440 A | 2/1964 | Heller |
| 3,691,770 A | 9/1972 | Nunn |
| 3,703,185 A | 11/1972 | Usry |
| 4,023,355 A | 5/1977 | McDonald |
| 4,384,690 A | 5/1983 | Brodersen |
| 4,760,694 A | 8/1988 | Gillon, Jr. |
| 4,765,565 A | 8/1988 | Buchele-Buecher et al. |
| 5,062,593 A | 11/1991 | Goddard et al. |
| 5,394,690 A | 3/1995 | Arszman et al. |
| 5,456,425 A | 10/1995 | Morris et al. |
| 5,491,973 A | 2/1996 | Knapp et al. |
| 5,749,559 A | 5/1998 | Dumortier et al. |
| 5,765,367 A | 6/1998 | Denoel et al. |
| 5,808,231 A | 9/1998 | Johnston et al. |
| 6,170,257 B1 | 1/2001 | Harada et al. |
| 6,412,275 B1 * | 7/2002 | Perrucci ..................... 60/204 |
| 6,502,384 B1 | 1/2003 | Onojima et al. |

(Continued)

*Primary Examiner*—Michael Cuff
*Assistant Examiner*—Craig Kim
(74) *Attorney, Agent, or Firm*—Ingrassia Fisher & Lorenz, P.C.

(57) ABSTRACT

Systems and methods of controlling solid propellant burn rate, propellant gas pressure, propellant gas pressure pulse shape, and propellant gas flow rate, rely on pulse width modulation of a control valve duty cycle. A control valve that is movable between a closed position and a full-open position is disposed downstream of, and in fluid communication with, a solid propellant gas generator. The solid propellant in the solid propellant gas generator is ignited, to thereby generate propellant gas. The control valve is moved between the closed position and the full-open position at an operating frequency and with a valve duty cycle. The valve duty cycle is the ratio of a time the control valve is in the full-open position to a time it takes the valve to complete one movement cycle at the operating frequency. The valve duty cycle is controlled to attain a desired solid propellant burn rate, propellant gas pressure, propellant gas pressure pulse shape, and/or propellant gas flow rate.

14 Claims, 6 Drawing Sheets

U.S. PATENT DOCUMENTS

| | | |
|---|---|---|
| 6,895,991 B2 | 5/2005 | Woessner |
| 6,951,317 B2 | 10/2005 | Woessner et al. |
| 6,986,246 B2 | 1/2006 | Fujita |
| 6,986,497 B1 | 1/2006 | Starken |
| 7,117,681 B2 | 10/2006 | Kato et al. |
| 2005/0120703 A1 | 6/2005 | Rohrbaugh et al. |
| 2005/0188701 A1 | 9/2005 | Kung et al. |
| 2005/0223695 A1 | 10/2005 | Sota, Jr. et al. |
| 2005/0284128 A1 * | 12/2005 | Anderson et al. ............. 60/204 |

* cited by examiner

| CONTROL VALVE DUTY CYCLE ||||
| STEP | t (INITIAL) | t (FINAL) | DUTY CYCLE (%) | FREQUENCY (Hz) |
| --- | --- | --- | --- | --- |
| 1 | 0.0 | 4.2 | 22 | 10 |
| 2 | 4.2 | 11.2 | 100 | N/A |
| 3 | 11.2 | 17 | 35 | 10 |
| 4 | 17 | 29 | 17 | 10 |

| CONTROL VALVE DUTY CYCLE | | | | |
|---|---|---|---|---|
| STEP | t (INITIAL) | t (FINAL) | DUTY CYCLE (%) | FREQUENCY (Hz) |
| 1 | 0 | 0.6 | 0 | - |
| 2 | 0.6 | 4.2 | 22 | 10 |
| 3 | 4.2 | 11.2 | 100 | - |
| 4 | 11.2 | 11.4 | 0 | - |
| 5 | 11.4 | 17 | 35 | 10 |
| 6 | 17 | 17.6 | 0 | - |
| 7 | 17.6 | 29 | 17 | 10 |
| 8 | 29 | - | 100 | - |

SOLID PROPELLANT BURN RATE, PROPELLANT GAS FLOW RATE, AND PROPELLANT GAS PRESSURE PULSE GENERATION CONTROL SYSTEM AND METHOD

TECHNICAL FIELD

The present invention generally relates to propellant gas generation and, more particularly, to a system and method of controlling solid propellant burn rate, propellant gas flow rate, and propellant gas pressure pulse generation by controlling the position duty cycle of a valve.

BACKGROUND

Solid propellant gas generators are used in rockets, missiles, interceptors, and various other vehicles and environments. For example, solid propellant gas generators may be used to generate propellant gas for both vehicle propulsion and direction control for missiles, munitions, and various spacecraft. Solid propellant gas generators may also be used to generate propellant gas to drive, for example, a gas turbine of either an airborne or earthbound backup power system. No matter the particular end-use system, a solid propellant gas generator typically includes a vessel that defines a combustion chamber within which one or more solid propellant masses are disposed. The solid propellant masses, when ignited, generate high-energy propellant gas. Depending upon the particular end-use system in which the solid gas generator is installed, the propellant gas may be supplied, or at least selectively supplied, to a rocket motor and/or reaction jets that may vary the thrust, pitch, yaw, roll or spin rate and other dynamic characteristics of a vehicle in flight, and/or to a gas turbine to generate backup power.

As is generally known, once a solid propellant mass is ignited, propellant gas generation continues until the entire mass is consumed. As is also generally known, the burn rate of a solid propellant mass may vary with the pressure in the combustion chamber. For example, if the combustion chamber pressure increases, the solid propellant burn rate increases. Conversely, if the combustion chamber pressure decreases, the propellant burn rate decreases. One way of controlling combustion chamber pressure, and thus propellant burn rate, is by controlling the effective flow area of a supply passage downstream of the combustion chamber. For example, if the effective flow area of the flow passage decreases, combustion chamber pressure increases, and vice-versa.

Various systems and methods have been developed for varying the effective flow area of a solid propellant gas generator supply passage. Such systems and methods include selectively venting propellant gas from the combustion chamber, throttling propellant gas flow using a fixed or variable area orifice, and throttling propellant gas flow via a variable position valve. Although these systems and methods are effective, each suffers certain drawbacks. For example, the present systems and methods can significantly affect overall gas generator efficiency, and may rely on fairly complex, relatively heavy, and or relatively costly components and control systems.

Hence, there is a need for a system and method of controlling solid propellant burn rate, combustion chamber pressure, and propellant gas flow that does not significantly affect overall efficiency and/or does not rely on fairly complex, relatively heavy, and/or relatively costly components and control systems. The present invention addresses one or more of these needs.

BRIEF SUMMARY

In one embodiment, and by way of example only, a method of controlling solid propellant burn rate includes disposing the solid propellant in a vessel. A control valve that is movable between a closed position and a full-open position is disposed downstream of, and in fluid communication with, the vessel. The solid propellant is ignited in the vessel to thereby generate propellant gas. The control valve is moved between the closed position and the full-open position at an operating frequency and with a valve duty cycle. The valve duty cycle is the ratio of the time the control valve is in the full-open position to the time it takes the valve to complete one movement cycle at the operating frequency. The valve duty cycle is controlled to attain a desired solid propellant burn rate.

In another exemplary embodiment, a method of controlling the shape of one or more propellant gas pressure profiles includes disposing solid propellant in a vessel. A control valve that is movable between a closed position and a full-open position is disposed downstream of, and in fluid communication with, the vessel. The solid propellant is ignited in the vessel to thereby generate propellant gas and a propellant gas pressure profile. The control valve is moved between the closed position and the full-open position at an operating frequency and with a valve duty cycle. The valve duty cycle is a ratio of the time the control valve is in the full-open position to the time it takes the valve to complete one movement cycle at the operating frequency. The valve duty cycle is controlled to shape the propellant gas pressure profile.

In yet another exemplary embodiment, a propellant gas generation and control system includes a vessel, a solid propellant, a control unit, and a control valve. The vessel defines a combustion chamber, and the solid propellant is disposed within the combustion chamber. The solid propellant is configured to generate propellant gas upon being ignited. The control unit is operable to selectively supply a control signal having a frequency and a duty cycle. The control valve is in fluid communication with the combustion chamber and is coupled to receive the control signal. The control valve is partially responsive to the control signal to move between a closed position and a full-open position at the frequency and duty cycle of the control signal.

Other independent features and advantages of the preferred gas generator control system and method will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements.

DETAILED DESCRIPTION OF VARIOUS PREFERRED EMBODIMENTS

The following detailed description is merely exemplary in nature and is not intended to limit the invention or the application and uses of the invention. Furthermore, there is no intention to be bound by any theory presented in the preceding background or the following detailed description.

Figure 1:
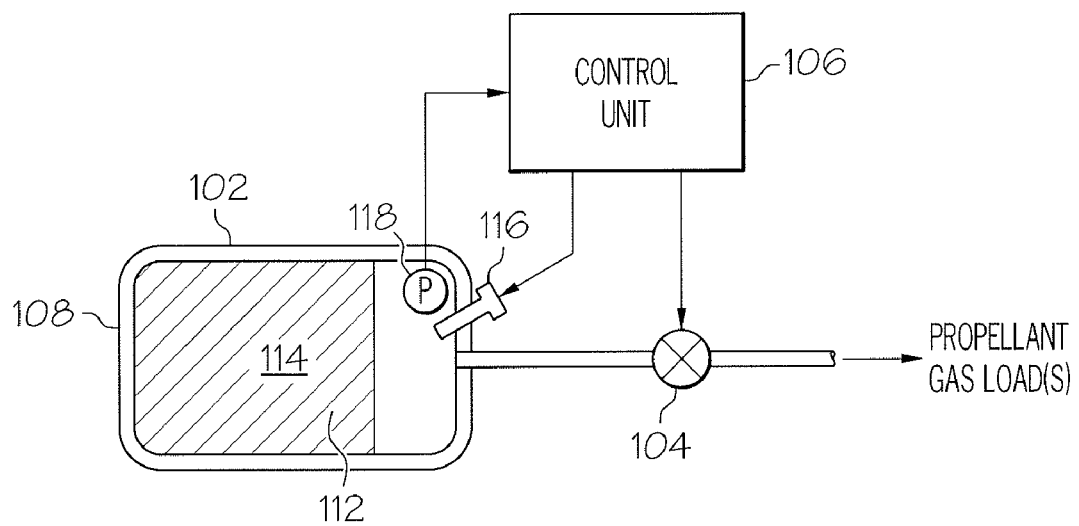
FIG. 1 is a functional block diagram of an exemplary embodiment of a solid propellant gas generation control system.

Turning first to FIG. 1, a functional block diagram of an exemplary embodiment of a solid propellant gas generation control system 100 is depicted. The system 100 includes a solid propellant gas generator 102, a control valve 104, and a control unit 106. The gas generator 102 includes a vessel 108 that defines a combustion chamber 112 in which a solid propellant 114 is disposed. The manner in which the solid propellant 114 is formed and subsequently loaded into the combustion chamber 112 are generally well known, and will thus not be further discussed. Moreover, the particular type of solid propellant 114 may vary. Some non-limiting examples of solid propellant 114 include ammonium nitrate and ammonium perchlorate. No matter the particular solid propellant 114 that is used, upon being ignited by an igniter 116, the solid propellant 114 produces propellant gas, which is directed toward one or more non-illustrated propellant gas loads via the control valve 104. It will be appreciated that the propellant gas load(s) may vary depending, for example, on the particular application for which the gas generator 102 is be used. For example, and as will be briefly described further below, the propellant gas load(s) may be one or more thrust nozzles or one or more gas turbines, just to name a couple of examples.

The control valve 104 is in fluid communication with the combustion chamber 112 and is movable between a closed position and an open position. In the closed position the control valve 104 fluidly isolates the propellant gas load(s) from the combustion chamber 112. In the open position, the control valve 104 fluidly couples the combustion chamber 112 to the propellant gas load(s). Thus, if the solid propellant 114 is ignited and producing propellant gas, when the control valve 104 is in the open position the propellant gas flows through the control valve 104 and to the propellant gas load(s). The control valve 104 is additionally coupled to receive a control signal from the control unit 106. The control valve 104 is configured to move between the closed and open positions at least partially in response to the received control signal.

The control unit 106, at least in the depicted embodiment, is configured to supply an initiation signal to the igniter 116 and, as noted above, a control signal to the control valve 104. The initiation signal supplied to the igniter 116 causes the igniter 116 to ignite the solid propellant 114, which in turn generates the propellant gas. One or more pressure sensors 118 (only one depicted in FIG. 1) may sense propellant gas pressure in or downstream of the combustion chamber 112 and supply pressure feedback signals to the control unit 106. The control signal supplied to the control valve 104 is preferably characterized by a frequency and a duty cycle. As a result, the control valve 104 moves between the closed and open positions at the frequency and duty cycle of the control signal. As will be described in more detail further below, the frequency and duty cycle of the control signal, and thus the concomitant movement of the control valve 104, may be variably selected to control propellant burn rate, propellant gas flow rate, combustion chamber pressure, and the shape of combustion chamber pressure pulses. Before doing so, however, a brief description of a particular preferred embodiment of the control valve 104 will be described.

Figure 2:
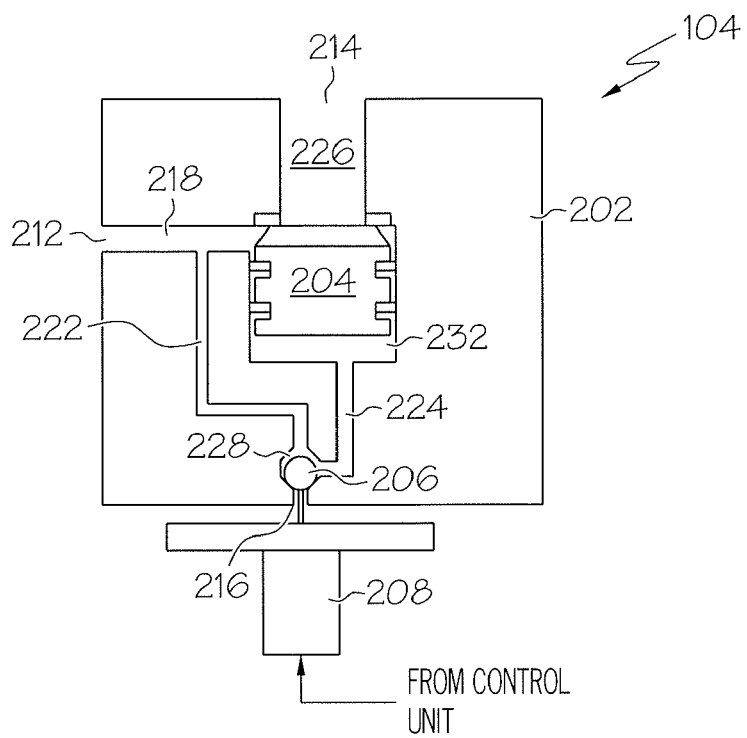
FIGS. 2 and 3 are simplified cross section views of a control valve, in the closed and open positions, respectively, that may be used in the system of FIG. 1.
Figure 3:
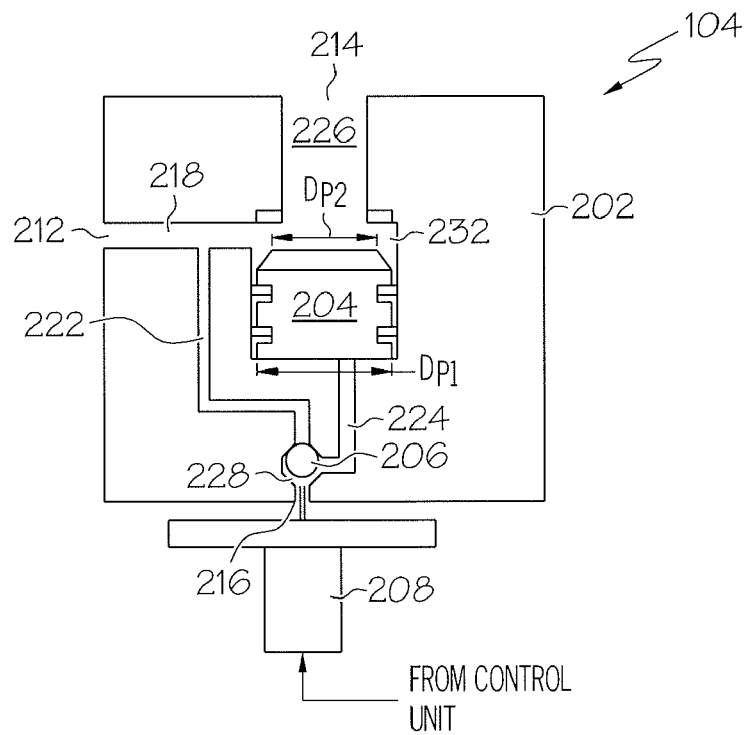

Turning now to FIGS. 2 and 3, simplified cross section views of the control valve 104 in the closed and open positions, respectively, are depicted. The control valve 104 includes a valve body 202, a poppet 204, a pilot valve 206, and an actuator 208. The valve body 202 includes a gas inlet port 212, a gas outlet port 214, a vent port 216, an inlet flow passage 218, a first control flow passage 222, a second control flow passage 224, an outlet flow passage 226, a pilot valve chamber 228, and a poppet valve chamber 232. The gas inlet port 212 is in fluid communication with, and thus receives propellant gas from, the combustion chamber 112. The gas inlet port 212 is additionally in fluid communication with the first flow control passage 222 and the poppet valve chamber 232 via the inlet flow passage 218. The gas outlet port 214 is in fluid communication with the poppet valve chamber 232, via the outlet flow passage 226, and with the propellant gas load(s). The first control flow passage 222 is in fluid communication with the pilot valve chamber 228, and the second control flow passage 224 is in fluid communication with both the pilot valve chamber 228 and the poppet valve chamber 232. The pilot valve chamber 228 is also in fluid communication with the vent port 216.

The poppet 204, which is preferably configured as a flat face poppet, is movably disposed within the valve body 202, and more particularly, is movably disposed within the poppet valve chamber 232. The poppet 204 is movable between the closed position, which is the position depicted in FIG. 2, and a full-open position, which is the position depicted in FIG. 3. As FIG. 2 depicts, when the poppet 204 is in the closed position the combustion chamber 112 is fluidly isolated from the gas outlet port 214. Conversely, and as FIG. 3 depicts, when the poppet 204 is in the full-open position the combustion chamber 112 is in fluid communication with the gas outlet port 214. The poppet 204 is preferably configured such that its outer diameter ($D_{P1}$) exceeds its sealing diameter ($D_{P2}$). This provides appropriate differential pressure areas to move the valve between the open and closed positions. It is additionally noted that the poppet 204 and valve body 202 are together configured to at least minimize seat leakage when the poppet 204 is in the closed position, and are further configured to be relatively insensitive to any potential axial seat misalignment. The manner in which the poppet moves between the closed and full-open positions will be described in more detail further below. Before doing so, however, the pilot valve 206 and actuator 208 will be briefly described.

The pilot valve 206 is disposed at least partially within the valve body 202. More particularly, at least in the depicted embodiment, the pilot valve 206 is disposed within the pilot valve chamber 228, extends through the vent port 216, and is coupled to the actuator 208. The pilot valve 206 is movable between a first position, which is depicted in FIG. 2, and a second position, which is depicted in FIG. 3. When the pilot valve 206 is in the first position, the pilot valve chamber 228 is fluidly isolated from the vent port 216, and the first control flow passage 222 is in fluid communication with the poppet valve chamber 232 via the pilot valve chamber 228 and the second control flow passage 224. When the pilot valve 206 is in the second position, the first control flow passage 222 is fluidly isolated from the pilot valve chamber 228, and the second control flow passage 224 is in fluid communication with the vent port 216 via the pilot valve chamber 228.

The pilot valve 206 is moved between the first and second positions by the actuator 208. The actuator 208, which in the depicted embodiment is implemented as a solenoid, is coupled to the pilot valve 206 and is further coupled to receive the control signal supplied from the control unit 106. It will be appreciated that the actuator 208 could be alternatively implemented using any one of numerous other electromechanical actuators. Nonetheless, the actuator 208 is configured, in response to the control signal from the control unit 106, to move the pilot valve 206 between the first and second positions.

Having structurally described a particular embodiment of the control valve 104, for completeness, the operation of the control valve 104 will now be described. In doing so it is assumed that the control valve 104 is initially configured as depicted in FIG. 2. When in this configuration, the control signal from the control unit 104 is such that the actuator 208 is deenergized. When the actuator 208 is deenergized, it moves the pilot valve 206 to the first position. As a result, propellant gas from the combustion chamber 112 flows into and through the gas inlet port 212, into and through the first control flow passage 222, through the pilot valve chamber 228 and the second control flow passage 224, and into the poppet valve chamber 232. When the propellant gas enters the poppet valve chamber 232 from the second control flow passage 224, the propellant gas pressure urges the poppet 204 toward the closed position. Thus, propellant gas cannot flow to the propellant gas load(s).

Turning now to FIG. 3, when the control signal supplied from the control unit 106 is such that the actuator 208 is energized, the actuator 208 moves the pilot valve 206 to the second position. As a result, the first control flow passage 222 is fluidly isolated from the pilot valve chamber 228. However, the second control flow passage 224 is in fluid communication with the vent port 216 via the pilot valve chamber 228. Thus, the propellant gas in the poppet valve chamber 232 urging the poppet 204 toward the closed position is now vented through the vent port 216. At the same time, propellant gas from the combustion chamber 112 flows into and through the gas inlet port 212, and into and through the inlet flow passage 218. The propellant gas pressure in the inlet flow passage 218 urges the poppet 204 toward the full-open position. With the poppet 204 in the full-open position, propellant gas flows through the poppet valve chamber 232, the outlet flow passage 226, and the gas outlet port 214 to the propellant gas load(s).

Figure 4:
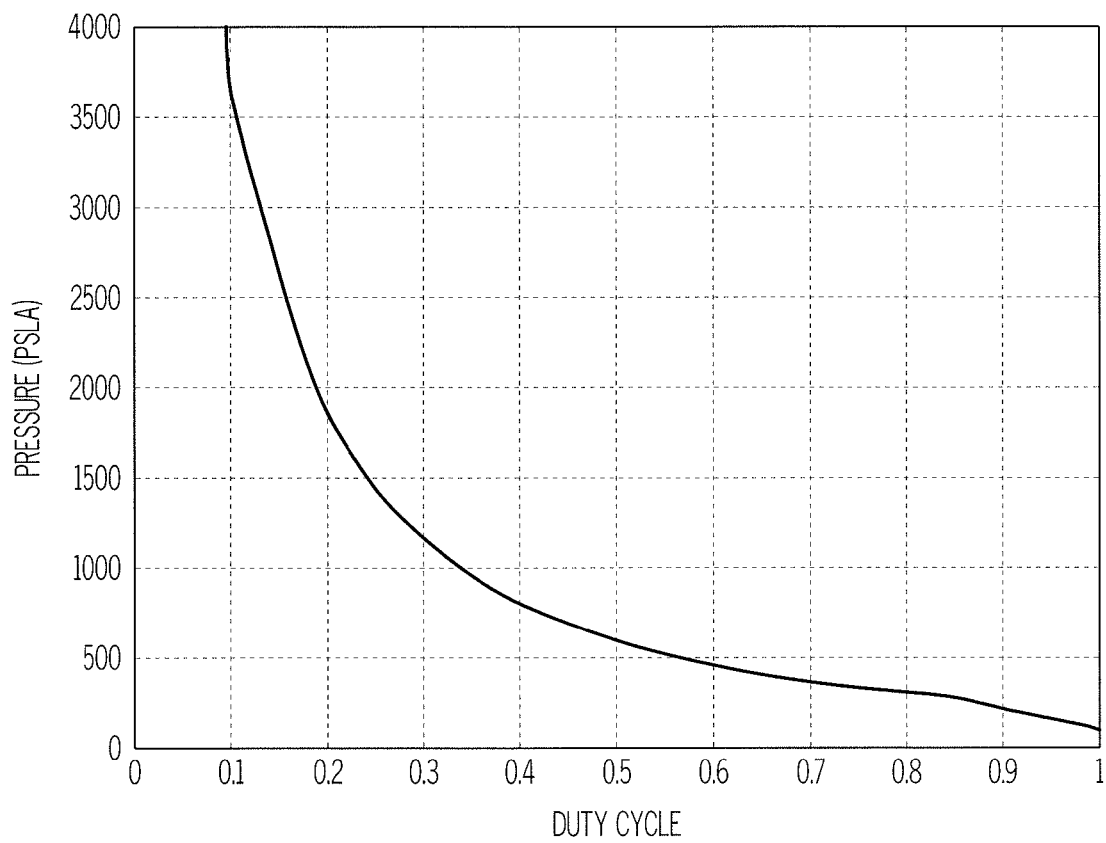
FIG. 4 is a graph that depicts simulated combustion chamber pressure versus control valve duty cycle for an exemplary system embodiment consistent with that depicted in FIG. 1.

From the above description, and as was previously noted, it may be appreciated that the control valve 104 is movable between the open and closed positions at the same frequency, and with the same duty cycle, as the control signal that is supplied to the actuator 208 from the control unit 106. In other words, the position of the control valve 104 can be pulse width modulated. Moreover, the effective flow area presented by the control valve 104 is proportional to the valve duty cycle. Hence, the effective flow area of the control valve 104 may also be pulse width modulated. Based on this capability, it may now be readily understood how the system 100 is configured to control combustion chamber pressure, propellant burn rate, and propellant gas flow rate. As an illustrative example, FIG. 4 graphically depicts simulated combustion chamber pressure versus control valve duty cycle for a control valve 104 having a 0.050-inch stroke, with the propellant gas flowing through a 0.250-inch diameter load orifice, and a control signal frequency of 10 Hz.

Figures 5, 6:
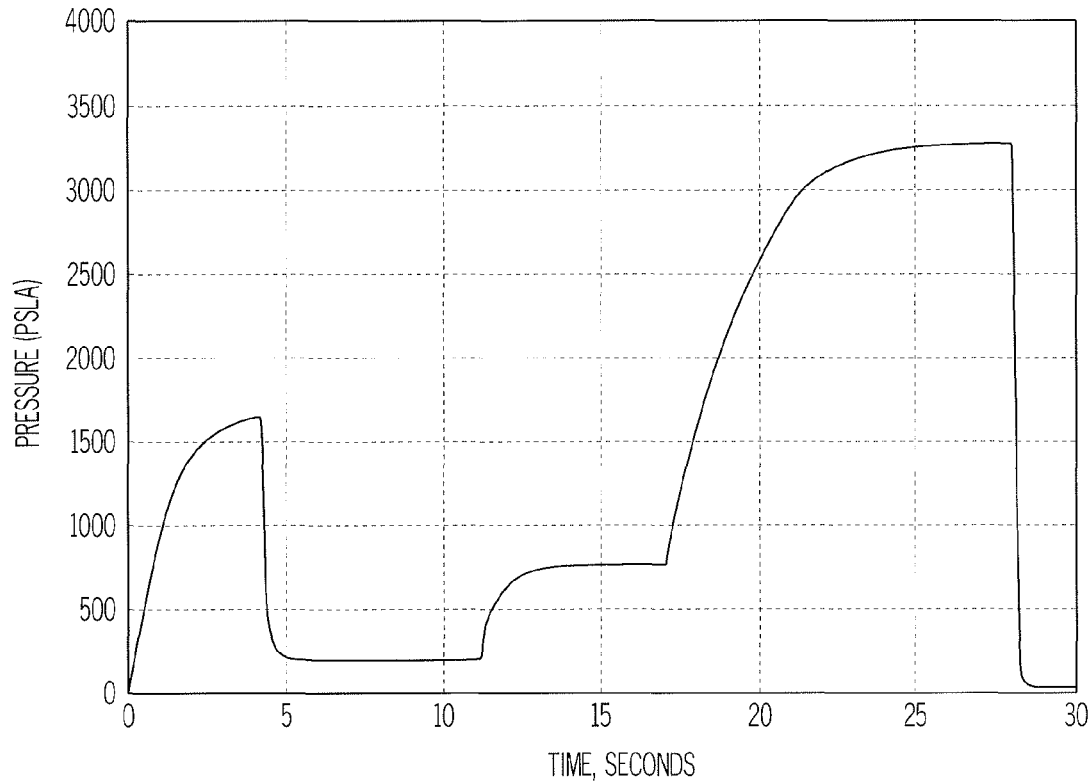
FIG. 5 is a graph that depicts simulated combustion chamber pressure versus time for a particular mission profile during which the combustion chamber pressure is controlled by varying the duty cycle of the control valve in the system of FIG. 1.
FIG. 6 is a table of the control valve duty cycle variation schedule that generates the pressure versus time graph of FIG. 5.

As a further illustrative example, FIG. 5 graphically depicts simulated combustion chamber pressure versus time for a particular mission profile during which the combustion chamber pressure is controlled by varying the duty cycle, and thus the effective flow area, of the control valve 104. Although the particular times and duty cycles may vary to meet a desired mission profile, in the depicted embodiment the frequency and duty cycle of the control valve 104 are controlled in accordance with the table depicted in FIG. 6. In addition to varying the particular times and duty cycles, it will be appreciated that features of the solid propellant 114 and/or the solid propellant itself may be varied to provide a desired pressure profile.

Figures 7, 8:
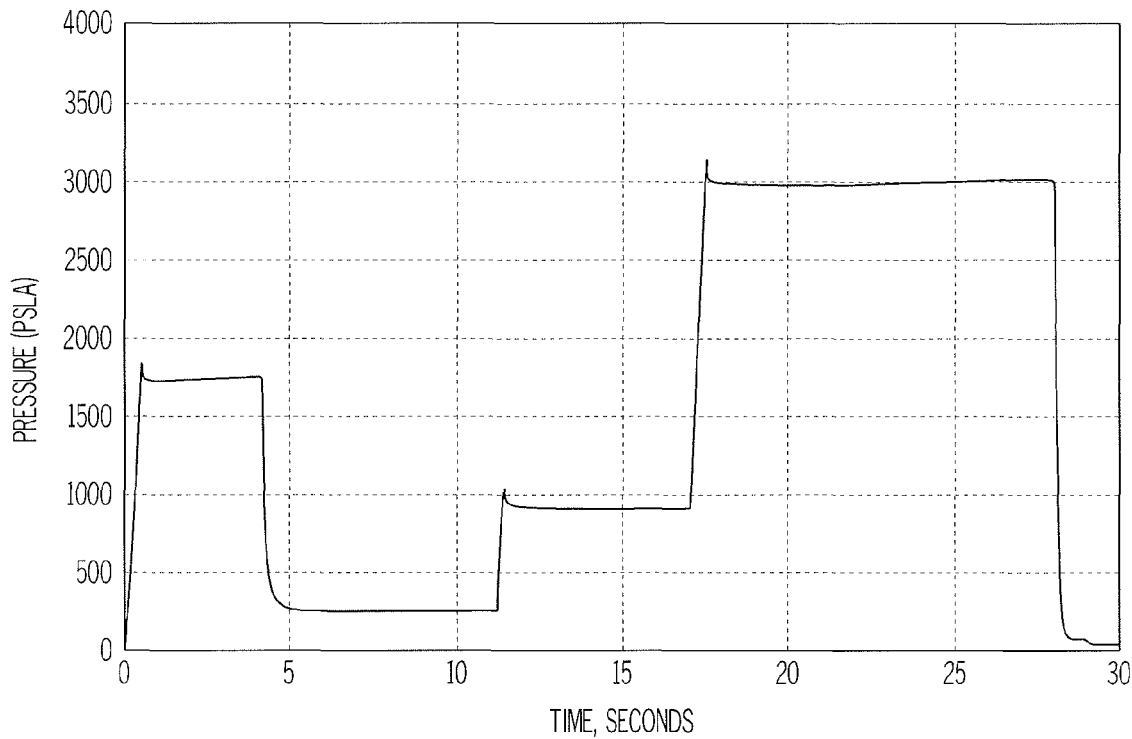
FIG. 7 is a graph similar to FIG. 5, but which depicts pressure pulses with improved response over those depicted in FIG. 5.
FIG. 8 is a table of the control valve duty cycle variation schedule that generates the pressure versus time graph of FIG. 7.

The combustion chamber pressure pulses depicted in FIG. 5 have fairly rounded leading edges. This is at least partially because the duty cycle at each commanded pressure level is constant. As noted above, the shape of the combustion chamber pressure pulses can be controlled. Preferably, this is accomplished by controlling the duty cycle of the control valve 104. As an illustrative example of this, reference should now be made to FIGS. 7 and 8. In FIG. 7, simulated combustion chamber pressure versus time is graphically depicted for the same mission profile represented in FIG. 5. However, it is seen that the leading edge of each pressure pulse is much steeper. This is because the duty cycle at each commanded pressure pulse is not constant, but varies with time. For example, the frequency and duty cycle of the control valve 104 are controlled in accordance with the table depicted in FIG. 8 It will be appreciated that the pressure pulse shapes depicted in FIGS. 5 and 7, and the associated frequency and duty cycle schedules depicted in FIGS. 6 and 8, respectively, are merely exemplary, and that the frequency and duty cycle schedule may be variously controlled to attain desired pressure pulse shapes. For example, the frequency and/or duty cycle may be continuously varied over a particular time period, if needed or desired, to attain one or more particular desired pressure pulse shapes.

The capability of controlling combustion chamber pressure and combustion pressure pulse shapes by controlling the frequency and/or duty cycle of the control valve 104 provides the concomitant capability of controlling propellant burn rate. In addition to these capabilities, it will be appreciated that propellant gas flow rate may also be controlled by controlling the frequency and/or duty cycle of the control valve. Propellant gas flow rate control may be desirable when the gas generator 102 is used to supply propellant gas, for example, partially or wholly for attitude control of a projectile, or to a gas turbine engine. For completeness, exemplary embodiments of each of these types of systems will now be briefly described.

Figure 9:
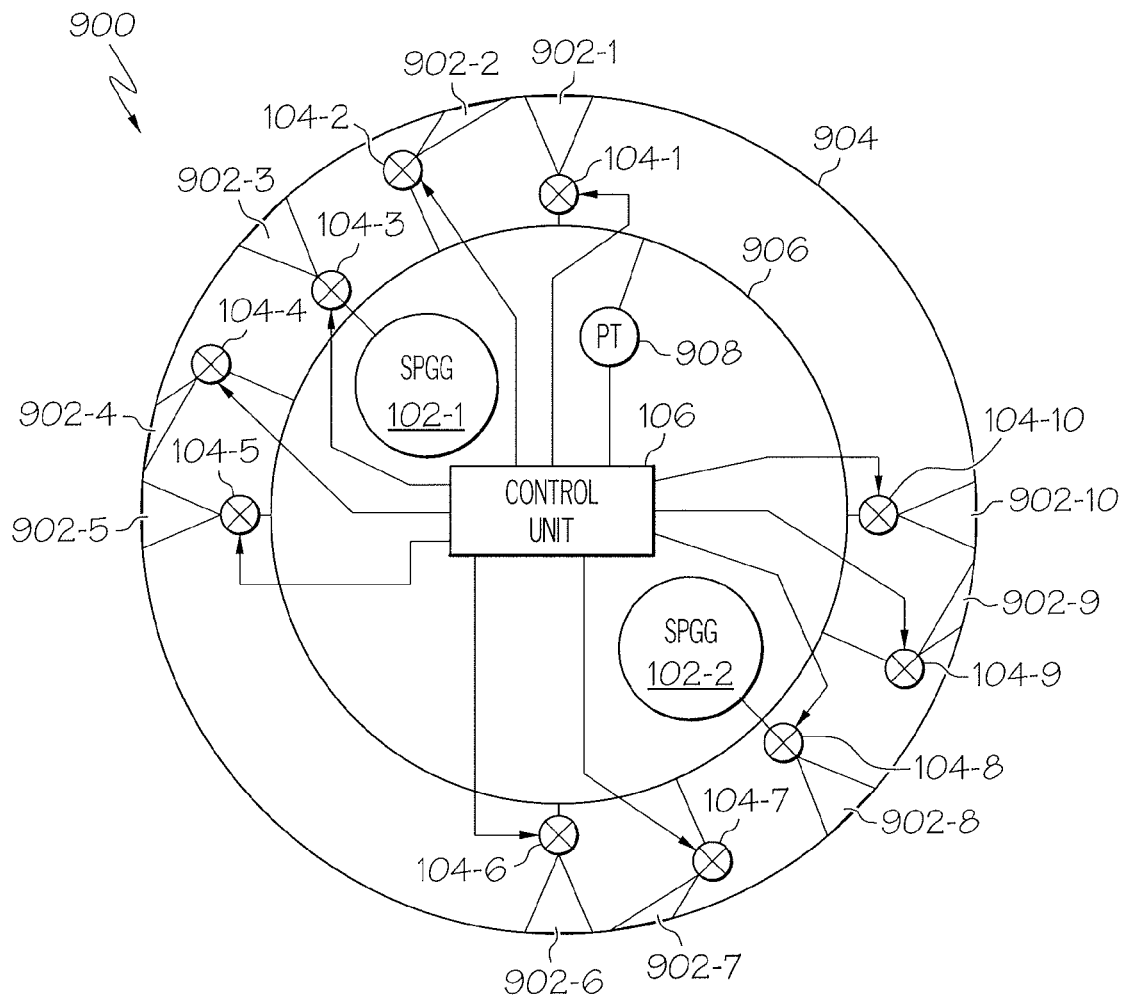
FIG. 9 is a simplified schematic diagram of an exemplary projectile attitude control system.

Turning now to FIG. 9, a simplified schematic diagram of an exemplary projectile attitude control system 900 is depicted. The depicted system 900 includes a plurality of solid gas generators 102 (e.g., 102-1, 102-2), a plurality of control valves 104 (e.g., 104-1, 104-2, 104-3, . . . , 104-10), a control unit 106, and a plurality of thruster nozzles 902 (e.g., 902-1, 902-2, 902-3, . . . , 902-10), all disposed within a projectile body 904. The gas generators 102, the control valves 104, and the control unit 106 are each configured identically, or at least substantially identically, to those previously described, and will thus not be further discussed. However, as is apparent from FIG. 9, the control unit 106 is coupled to each of the control valves 104, and is thus configured to supply a plurality of individual control signals to thereby individually control each control valve 104. Moreover, before proceeding further it is noted that the system 900 depicted in FIG. 9 is merely exemplary, and that the system 900 could be implemented with more or less than two solid gas generators (e.g., 102-1, 102-2, 102-3, . . . , 102-N), more or less than ten control valves (e.g., 104-1, 104-2, 104-3, . . . , 104-N), more than a single control unit (e.g., 106-1, 106-2, 106-3, . . . , 106-10), and more or less than 10 thruster nozzles (e.g., 902-1, 902-2, 902-3, . . . , 902-N).

The thruster nozzles 902 may be variously configured and arranged, but in the depicted embodiment the system 900 includes six radial thruster nozzles 902-1, 902-3, 902-5, 902-6, 902-8, 902-10, and four tangential thruster nozzles 902-2, 902-4, 902-7, 902-9 to provide pitch, yaw, and roll control for the vehicle. The control valves 104 are each disposed upstream of one of the thruster nozzles 902 and thus, in response to the control signal it receives from the control unit 106, controls propellant gas flow to the associated thruster nozzle 902. As FIG. 9 additionally depicts, the gas generators 102 are each in fluid communication with a manifold 906, which is in fluid communication with each of the control valves 104. With this arrangement, either one or both gas generators 102 can supply propellant gas to the thruster nozzles 902. One or more sensors 908 are coupled to the manifold 906 and are configured to sense one or more propellant gas parameters. In the depicted embodiment, a pressure (P) and a temperature (T) sensor 908 are provided which supply pressure and temperature feedback signals, respectively, to the control unit 106. It will be appreciated that the system 900 could be implemented with more than pressure and/or temperature sensors 908, and could additionally be implemented with various other types of sensors, if needed or desired. It will additionally be appreciated that the system 900 could be implemented without the manifold 906. In such an embodiment, each gas generator 102 could only supply propellant gas to selected ones of the thruster nozzles. For example, if the embodiment of FIG. 9 were implemented without the manifold 906, one gas generator 102-1 would only supply propellant gas to half of the thruster nozzles 902-1 through 902-6, and the other gas generator 102-2 would supply propellant gas to the other half of the thruster nozzles 902-6 through 902-10. The system of FIG. 9 system also provides the capability to control propellant gas flow from one or both gas generators 102, such that one or more valves 104 aligned along a desired thrust axis may be commanded to a full open position to achieve fast thrust response, while other valves 104 may be controlled at a desired duty cycle to regulate gas generator 102 burn pressure and deliver zero net thrust.

Figure 10:
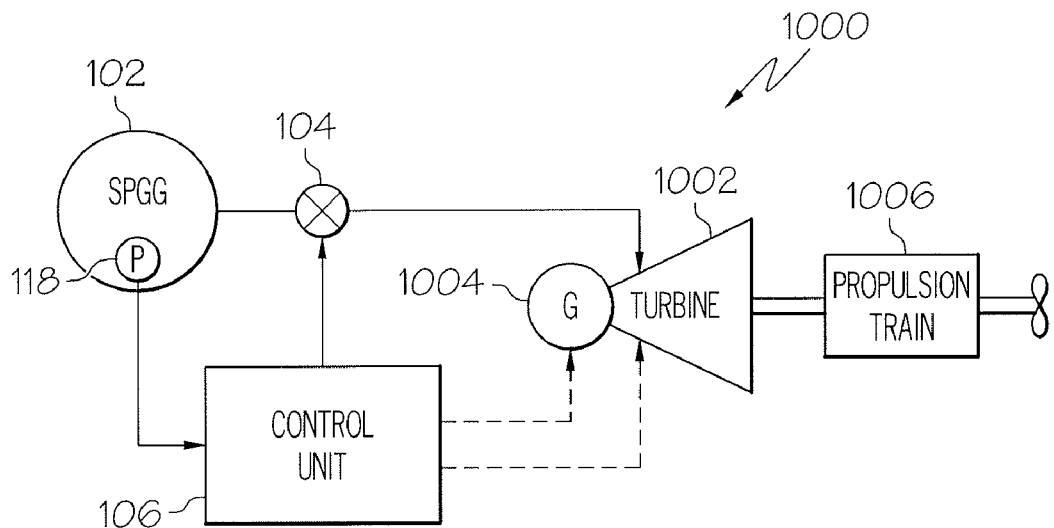
FIG. 10 is a simplified schematic diagram of an exemplary turbine-driven backup power system.

With reference now to FIG. 10, a simplified schematic diagram of an exemplary turbine-driven backup power system 1000 is depicted and will be described. The depicted system 1000 includes a solid propellant gas generator 102, a control valve 104, and a control unit 106. As with the embodiment depicted in FIG. 9 and described above, the solid gas generator 102, the control valve 104, and the control unit 106 are each configured identically, or at least substantially identically, to those previously described, and will thus not be further discussed. However, as depicted in phantom in FIG. 10, the control unit could be additionally configured to control, fully or partially, a turbine 1002 and a generator 1004. The turbine 1002 is preferably a gas turbine that is configured to rotate upon propellant gas being supplied thereto. The generator 1004, which may be implemented using any one of numerous types of AC or DC generators, is configured to generate electrical power when it is rotated by the turbine 1002. As FIG. 10 also depicts, the gas turbine 1002 could additionally, or instead, be configured to drive a propulsion train 1006. In such an embodiment, the system is preferably disposed within, for example, an underwater vehicle, which may be an unmanned underwater vehicle.

The systems and methods disclosed herein provide for the selective or collective control of solid propellant burn rate, combustion chamber pressure and pulse shapes, and propellant gas flow. The systems and methods thus conserve propellant utilization, which can extend burn duration, range, and mission flexibility of projectile systems and backup power systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling solid propellant burn rate, comprising the steps of:
   disposing the solid propellant in a vessel;
   disposing a control valve between, and in fluid communication with, the vessel and a propellant gas load, the control valve movable between a closed position and a full-open position;
   igniting the solid propellant in the vessel to thereby generate propellant gas;
   moving the control valve between the closed position, in which the propellant gas load is fluidly isolated from the vessel, and the full-open position, in which the propellant gas load is fluidly coupled to the combustion chamber, at an operating frequency and with a valve duty cycle, the valve duty cycle being a ratio of time the control valve is in the full-open position to time it takes the control valve to complete one movement cycle at the operating frequency; and
   varying the valve duty cycle with time to attain a desired solid propellant burn rate.

2. The method of claim 1, further comprising:
   varying the operating frequency of the control valve.

3. The method of claim 1, further comprising:
   controlling the valve duty cycle to control propellant gas pressure in the vessel.

4. The method of claim 1, further comprising:
   controlling the valve duty cycle to control propellant gas pressure pulse generation in the vessel.

5. The method of claim 4, wherein the propellant gas pressure pulses each have a pulse shape, and wherein the method further comprises:
   controlling the valve duty cycle to control the pulse shape of each of the propellant gas pressure pulses.

6. The method of claim 1, further comprising:
controlling the valve duty cycle to control mass flow rate of the propellant gas from the vessel through the control valve.

7. The method of claim 1, further comprising:
disposing one or more additional control valves downstream of, and in fluid communication with, the vessel, such that each control valve is fluidly coupled in parallel with each other; and
controlling the valve duty cycle of each of the control valves.

8. The method of claim 7, further comprising:
disposing a thrust nozzle downstream of each control valve, each nozzle configured to generate a thrust when propellant gas flows there-through; and
controlling the thrust generated by each nozzle by controlling the valve duty cycle of each control valve.

9. A method of controlling the shape of one or more propellant gas pressure profiles, comprising the steps of:
disposing solid propellant in a vessel;
disposing a control valve between, and in fluid communication with, the vessel and a propellant gas load, the control valve movable between a closed position and a full-open position;
igniting the solid propellant in the vessel to thereby generate propellant gas and a propellant gas pressure profile;
moving the control valve between the closed position, in which the propellant gas load is fluidly isolated from the vessel, and the full-open position, in which the propellant gas load is fluidly coupled to the combustion chamber, at an operating frequency and with a valve duty cycle, the valve duty cycle being a ratio of time the control valve is in the full-open position to time it takes the control valve to complete one movement cycle at the operating frequency; and
varying the valve duty cycle with time to shape the propellant gas pressure profile.

10. The method of claim 9, further comprising:
controlling the valve duty cycle to attain a desired solid propellant burn rate.

11. The method of claim 9, further comprising:
varying the operating frequency of the control valve.

12. The method of claim 9, further comprising:
controlling the valve duty cycle to control mass flow rate of the propellant gas from the vessel through the control valve.

13. The method of claim 9, further comprising:
disposing one or more additional control valves downstream of, and in fluid communication with, the vessel, such that each control valve is fluidly coupled in parallel with each other; and
controlling the valve duty cycle of each of the control valves.

14. The method of claim 13, further comprising:
disposing a thrust nozzle downstream of each control valve, each nozzle configured to generate a thrust when propellant gas flows there-through; and
controlling the thrust generated by each nozzle by controlling the valve duty cycle of each control valve.

* * * * *